United States Patent Office 3,696,009
Patented Oct. 3, 1972

3,696,009
ELECTRO SYNTHESIS OF TETRAORGANOLEAD COMPOUNDS
Evan A. Mayerle and James R. Minderhout, Lake Jackson, Tex., assignors to Nalco Chemical Company, Chicago, Ill.
No Drawing. Filed Sept. 30, 1971, Ser. No. 185,360
Int. Cl. C07b 29/06
U.S. Cl. 204—72                                                    6 Claims

ABSTRACT OF THE DISCLOSURE

Tetraorganolead compounds may be prepared by electrolyzing aqueous solutions of triorganolead salts.

INTRODUCTION

This invention relates to a method of producing tetraorganolead compounds by the electrolysis of aqueous solutions containing dissolved therein triorganolead salts. The invention specifically relates to a method for producing tetramethyl and tetraethyllead using this electrolysis procedure.

Many salts of triorganolead compounds are water soluble. They oftentimes result from the manufacture of tetraorganolead compounds which are used as gasoline additives. It is common to equilibrate mixtures of tetramethyllead and tetraethyllead by reacting these compounds with acid catalysts in a non-aqueous environment. This equilibration reaction is well-known and produces mixed tetramethyl and tetraethyllead compounds. The chemistry of this reaction is described in volume 62 of the Journal of the American Chemical Society, pages 1099–1110. This article shows a large number of metallic salt catalysts which may be used to produce equilibrated mixtures of tetraorganolead compounds. Typical of such catalysts are aluminum chloride and boron trifluoride.

After equilibration reactions have been completed, it is customary to wash the equilibrated mix with water or aqueous caustic and either discard the water which contains the spent catalyst or reuse it by adding additional caustic. Because of these processes quantities of trialkyllead salts or distributed mixtures thereof concentrate in such waters. In some cases concentrations of these salts can be as high as 20–30% by weight. It would be beneficial if a simple method were available whereby these water soluble lead salts could be removed from their aqueous solutions as a useful product. Such a removal also would achieve a reduction in the lead content of the water from which they are extracted whereby it could be safely discarded or reused.

THE INVENTION

The invention in its broadest aspects is directed toward the preparation of tetraorganolead compounds which is accomplished by electrolyzing an aqueous solution of a triorganolead salt. The electrolysis produces a mixture of lead and a tetraorganolead compound which are not miscible with water and are therefore easily separated. Simple solvent extraction or other procedures may be used to separate the tetraorganolead compound from the lead. The invention is particularly useful for converting trimethyllead or triethyllead salts from aqueous solutions thereof and forming them into either tetraethyl or tetramethyllead. In a similar fashion distributed mixtures of trimethyllead and triethyllead salts may be converted to the corresponding tetraorganolead compounds.

The electrolysis of the aqueous solutions of triorganolead salts may be conducted by using voltages within the range of 1–30 volts and current densities ranging from 0.2–5 amps/in.[2]. The electrolysis may be conducted at room temperature although it is capable of proceeding more rapidly at temperatures within the range of 110–200° F. The electrolysis is substantially complete over periods of time ranging between 10 minutes to as long as 8–10 hours. The time of the reaction is dependent upon many variables such as cell design, the amount of current used, the temperature, triorganolead salt concentration and the like.

It is beneficial if the starting pH of the triorganolead salt solution is within the range of 4–9 and preferably 6–8. Most preferably this latter pH range is maintained throughout the electrolysis. The concentration of the triorganolead salt solution should be at least 0.5% by weight although preferably it is at least 2% by weight and may be as high as the saturation solubility of the triorganolead salt solution. In the case of trimethyllead chloride the concentration of this salt may be as high as 20–30% by weight.

Any aqueous triorganolead salt solution may be operated upon by the process of this invention. Typical anions of such salts are those anions which are derived from inorganic acids or lower molecular weight organic acids. Typical triorganolead salts are the chlorides, bromides, fluoroborates, phosphates, acetates and the like. For a more complete listing of triorganolead salts see, "The Organic Compounds of Lead." Shapiro and Frey, Interscience Publishers, 1968, particularly p. 256 et subs.

Upon completion of the electrolytic reaction the lead content of the electrolyzed solution will be reduced to levels as low as 2000 p.p.m. At this low level the water may be reused for industrial process purposes or fresh triorganolead salts may be added to for purposes of conversion thereto of tetraorganolead compounds.

To illustrate the invention the following are given by way of example:

Example 1

Most of the D.C. electrolyses were carried out in an open beaker using a carbon anode and either a lead or carbon cathode. The mixture was stirred with a magnetic stirrer. Blackish solids plated out on the cathode and an oily liquid appeared. Gases appeared to be given off but were not captured in most cases. Data on these runs is given in Table I.

TABLE I.—D.C. ELECTROLYSES

| Pb mmole/gm. | | pH | | Current passed theory | Pb removed, percent | Current eff., percent | Remarks |
|---|---|---|---|---|---|---|---|
| Start | End | Start | End | | | | |
| 0.54 | 0.14 | 4.5 | 0.6 | 1.0 | 78 | 78 | Beaker run, TMLC.[1] |
| 1.25 | 0.56 | 2.9 | 1.0 | 0.8 | 57 | 71 | Do. |
| 1.25 | 0.07 | 2.9 | 1.2 | 1.2 | 96 | 84 | Do. |
| 1.25 | 0.59 | 2.9 | 0.0 | 1.1 | 65 | 62 | Do. |
| 0.44 | 0.16 | 5.5 | 2.6 | 1.0 | 69 | 69 | Do. |
| 0.17 | 0.06 | 7.8 | 5.5 | 1.0 | 67 | 67 | C.D.[2] run—1 amp/in.[2]. |
| 0.17 | 0.08 | 7.8 | 5.9 | 1.1 | 56 | 51 | C.D. run—2 amps/in.[2]. |
| 0.17 | 0.04 | 7.8 | 5.6 | 1.0 | 78 | 74 | C.D. run—0.5 amp/in.[2]. |
| 0.17 | 0.02 | 7.8 | 5.0 | 2.1 | 89 | 43 | C.D. run—1 amp/in.[2]. |
| 0.17 | 0.06 | 9.0 | 7.3 | 1.0 | 66 | 66 | C.D. run—1 amp. |

[1] Trimethyl lead chloride.  [2] Current density.

The first D.C. electrolysis was run on a solution of trimethyllead chloride (TMLC) in D.I. water. Passage of the theoretical amount of current reduced the lead content from 0.54 to 0.14 mmole/gram. The oil obtained in this run was 99+% TML.

Other D.C. electrolyses, in beakers, were carried out on a tetraethyllead and tetramethyllead equilibrated mix (E-mix) wash water with lead contents of 1.25 and 0.44 mmoles/gram. Here the same pattern was observed as with the trimethyllead chloride: black solids and a heavy organic liquid. A typical analysis was: TML 5.4%, $Me_3$ 25.5%, $Me_2$ 40.7%, $Me_2$ 24.6%, TEL 3.8%. The gray-blackish solids were heavy and finely divided Pb. Upon exposure to air, these solids acquired a whitish coating in many cases.

Example 2

A flow type cell for the electrolysis of E-mix wash water was assembled. It was an 8″ section of 2″ diameter glass pipe with ¼″ diameter carbon rods spaced around the circumference. Each carbon rod had an effective electrode area of 2 square inches. Tetraethyllead-tetramethyllead equilibration mix wash water was circulated from a surge drum through the cell and back to the surge drum.

Five electrolyses were run by charging a weighed amount of the (E-mix) water to the cell, circulating and electrolyzing. In three of these runs, the current density was varied. The other two runs were made to determine the effect of changing pH. Samples were taken for Pb analysis before and periodically through each run. For each run, the theoretical number of ampere minutes, based on a one electron process, was calculated. Because the weights charged to the cell differed from run to run, the points at which samples were taken are designated as the percent of the theoretical ampere minutes. The data so obtained is reported in Table II.

not analyzed. There seemed to be more metallic Pb in the run at higher pH.

We claim:
1. A method for preparing tetraorganolead compounds which comprises electrolyzing an aqueous solution of a triorganolead salt whereby a mixture of lead and a tetraorganolead compound are formed, separating the lead and tetraorganolead compound from the solution and then removing the tetraorganolead compound.

2. The method of claim 1 where the tetraorganolead compound contains at least one organic radical from the group consisting of methyl and ethyl and the pH of the aqueous solution of the triorganolead salt is within the range of from 4–9.

3. The method of claim 2 where the pH is maintained between 6–8 throughout the electrolysis of said organolead salt.

4. A method of preparing tetramethyl and tetraethyllead which comprises electrolyzing an aqueous solution of trimethyllead salt or a triethyllead salt at a voltage of from 1–30 volts and a current density of from 0.2–5 amps./in.$^2$ for a period of time sufficient to convert a substantial quantity of said salts to free lead and the tetramethyllead and tetraethyllead maintaining the pH of the aqueous solution during said electrolysis within the range of 6–8 separating the lead and tetramethyllead or tetraethyllead from the solution and then recovering the tetramethyllead or tetraethyllead.

5. The method of claim 4 where the anion of the tetraethyllead salts is the anion of an inorganic acid.

6. The method of claim 4 where the trimethyllead or the triethyllead salt is a distributed mixture of said salts.

TABLE II.—ELECTROLYSIS OF E-MIX WASH WATER IN FLOW CELL

| Runs made on water as received. pH 7.0 → 5.7 | | | | | | | | | | Runs made after pH was adjusted | | | | | |
|---|---|---|---|---|---|---|---|---|---|---|---|---|---|---|---|
| C.D.=2.5 amps/in.$^2$ | | | C.D.=1.5 amps/in.$^2$ | | | C.D.=0.75 amp/in.$^2$ | | | pH 4.8 → 3.2 | | | pH 9.2 → 6.6 | | |
| Pb, mm./gm. | Amp-min. as percent theory | C.E., percent | Pb, mm./gm. | Amp-min. as percent theory | C.E., percent | Pb, mm./gm. | Amp-min. as percent theory | C.E., percent | Pb, mm./gm. | Amp-min. percent theory | C.E., percent | Pb, mm./gm. | Amp-min. percent theory | C.E., percent |
| .17 | 0 | ----- | .17 | 0 | ----- | .17 | 0 | ----- | .17 | 0 | ----- | .17 | 0 | ----- |
| .11 | 46 | 77 | .13 | 25 | 94 | .13$_2$ | 27 | 87 | .16 | 52 | 11 | .14$_1$ | 32 | 53 |
| .09 | 91 | 52 | .11 | 50 | 71 | .10$_5$ | 54 | 71 | .16 | 104 | 6 | .12$_8$ | 64 | 50 |
| .06 | 137 | 47 | .05 | 100 | 71 | .07$_1$ | 81 | 73 | .14 | 156 | 11 | .11$_1$ | 97 | 42 |
| .05 | 183 | 39 | | | | .05$_6$ | 108 | 62 | .13 | 208 | 11 | .09$_8$ | 129 | 34 |
| .04 | 229 | 33 | | | | .03$_5$ | 135 | 58 | | | | .09$_8$ | 161 | 27 |
| | | | | | | .02$_4$ | 161 | 53 | | | | .06$_8$ | 193 | 31 |
| | | | | | | .01$_4$ | 188 | 49 | | | | .05$_9$ | 225 | 29 |
| | | | | | | .01$_3$ | 215 | 43 | | | | .04$_5$ | 257 | 29 |
| | | | | | | .009$_5$ | 242 | 39 | | | | .02$_7$ | 289 | 2$_3$ |

At the end of each run, the unit was drained as thoroughly as possible and the drainings filtered. The filtrate would be mainly a clear aqueous phase with a small amount of heavy oil as a second phase. This was E-mix. Solids left on the filter consisted of some apparently metallic Pb and other grayish-whitish solids which were References Cited

UNITED STATES PATENTS 1,567,159  12/1925  Mead _____ 204—72

JOHN H. MACK, Primary Examiner

R. L. ANDREWS, Assistant Examiner